US011359711B2

(12) United States Patent
Mariotti et al.

(10) Patent No.: US 11,359,711 B2
(45) Date of Patent: Jun. 14, 2022

(54) CONTINUOUSLY VARIABLE TRANSMISSION DEVICE WITH A DEVICE FOR VARYING THE GEAR SHIFT CURVE (71) Applicant: PIAGGIO & C. S.p.A., Pisa (IT)

(72) Inventors: Walter Mariotti, Pisa (IT); Giacomo Freschi, Pisa (IT); Paolo Nesti, Pisa (IT)

(73) Assignee: PIAGGIO & C. S.p.A., Pisa (IT)

( * ) Notice: Subject to any disclaimer, the term of this patent is extended or adjusted under 35 U.S.C. 154(b) by 481 days.

(21) Appl. No.: 16/060,827

(22) PCT Filed: Dec. 1, 2016

(86) PCT No.: PCT/IB2016/057252
§ 371 (c)(1),
(2) Date: Jun. 8, 2018

(87) PCT Pub. No.: WO2017/098379
PCT Pub. Date: Jun. 15, 2017

(65) Prior Publication Data
US 2018/0355967 A1 Dec. 13, 2018

(30) Foreign Application Priority Data
Dec. 10, 2015 (IT) .......................... 102015000081842

(51) Int. Cl.
F16H 55/56 (2006.01)
F16H 9/12 (2006.01)
(Continued)

(52) U.S. Cl.
CPC ........... F16H 55/563 (2013.01); F16H 9/125 (2013.01); F16H 9/16 (2013.01); F16H 9/18 (2013.01);
(Continued)

(58) Field of Classification Search
CPC ..... F16H 9/18; F16H 9/16; F16H 9/12; F16H 9/14; F16H 9/125; F16H 55/563;
(Continued)

(56) References Cited

U.S. PATENT DOCUMENTS 2,711,103 A * 6/1955 Miner ................. F16H 61/6625
474/19
3,699,827 A * 10/1972 Vogel ................. F16H 61/6625
474/12
(Continued)

FOREIGN PATENT DOCUMENTS

EP 1 223 366 A2 7/2002
EP 2 767 736 A1 8/2014
(Continued)

OTHER PUBLICATIONS

JPH05203005A Translation; Takebe, M; V-Belt Type Automatic Transmission; Published: Aug. 10, 1993; Espacenet (Year: 1993).*
(Continued)

Primary Examiner — Michael R Mansen
Assistant Examiner — Raveen J Dias
(74) Attorney, Agent, or Firm — Merchant & Gould P.C.

(57) ABSTRACT

A continuously variable transmission device (1) for a two-wheel, three-wheel or four-wheel motorcycle includes a cam system (20, 22; 32a, 32b) operating between a fixed bushing (11) and a mobile bushing (9). The device is configured to obstruct the approach between the active surfaces (8a, 10a) or to facilitate the approach of the active surfaces.

6 Claims, 8 Drawing Sheets (51) Int. Cl.
*F16H 55/52* (2006.01)
*F16H 9/16* (2006.01)
*F16H 9/18* (2006.01)
*F16H 55/49* (2006.01)

(52) U.S. Cl.
CPC ............. *F16H 55/52* (2013.01); *F16H 55/56* (2013.01); *F16H 9/12* (2013.01); *F16H 55/49* (2013.01)

(58) Field of Classification Search
CPC ...... F16H 55/566; F16H 55/56; F16H 61/662; F16H 61/66; F16H 2009/163; F16H 2009/166; F16H 55/52; F16H 55/49; F16H 9/00; F16H 9/04; F16H 9/20; F16H 9/24
See application file for complete search history.

(56) References Cited

U.S. PATENT DOCUMENTS

| | | | |
|---|---|---|---|
| 2002/0119846 A1* | 8/2002 | Kitai | F16H 55/56 474/14 |
| 2004/0082415 A1* | 4/2004 | Borghi | F16H 55/563 474/13 |
| 2004/0092345 A1* | 5/2004 | Borghi | F16H 55/56 474/19 |
| 2004/0166971 A1* | 8/2004 | Borghi | F16H 55/56 474/17 |
| 2004/0171443 A1* | 9/2004 | Borghi | F16D 43/08 474/12 |
| 2005/0096163 A1* | 5/2005 | Gu | F16H 63/067 474/10 |
| 2007/0202975 A1* | 8/2007 | Ishida | F16H 9/18 474/8 |
| 2008/0125257 A1* | 5/2008 | Ishida | F16H 55/56 474/14 |
| 2008/0190673 A1* | 8/2008 | Sugitani | F16H 9/18 180/54.1 |
| 2013/0150190 A1* | 6/2013 | Ishino | F16H 55/56 474/17 |
| 2013/0158823 A1* | 6/2013 | Dec | F16H 63/062 701/58 |
| 2014/0031155 A1* | 1/2014 | Tsukamoto | F16H 63/067 474/46 |
| 2014/0235382 A1* | 8/2014 | Tsukamoto | F16H 63/067 474/14 |
| 2015/0005118 A1* | 1/2015 | Seo | F16H 61/66 474/13 |
| 2015/0024882 A1* | 1/2015 | Ochab | F16H 63/067 474/19 |
| 2015/0111674 A1* | 4/2015 | Yuan | F16H 55/563 474/14 |
| 2017/0114875 A1* | 4/2017 | Yoshimura | F16H 9/14 |
| 2017/0114894 A1* | 4/2017 | Yuki | B60W 10/107 |
| 2018/0355966 A1* | 12/2018 | Mariotti | F16H 55/563 |

FOREIGN PATENT DOCUMENTS

| | | |
|---|---|---|
| JP | 38-404 Y | 1/1963 |
| JP | H05-203005 A | 8/1993 |
| JP | H08-178003 A | 7/1996 |
| JP | H08-178004 A | 7/1996 |
| JP | 2002-227949 A | 8/2002 |
| JP | 2002-250417 A | 9/2002 |
| JP | 2015-086948 A | 5/2015 |
| WO | 2009/096385 A1 | 8/2009 |

OTHER PUBLICATIONS

Japanese Office Action for corresponding Japanese Patent Application No. 2018-529049 dated Jul. 14, 2020, 5 pages.

International Search Report and Written Opinion of the International Searching Authority for International Patent Application No. PCT/IB2016/057252 dated Feb. 9, 2017, 8 pages.

\* cited by examiner

Conventional CVT

CVT with a cam on the front group

FIG.9

CONTINUOUSLY VARIABLE TRANSMISSION DEVICE WITH A DEVICE FOR VARYING THE GEAR SHIFT CURVE

This application is a National Stage Application of PCT/IB2016/057252, filed 1 Dec. 2016, which claims benefit of Serial No. 102015000081842, filed 10 Dec. 2015, and which applications are incorporated herein by reference. To the extent appropriate, a claim of priority is made to each of the above-disclosed applications.

BACKGROUND OF THE INVENTION

The present invention relates to a transmission system, in particular a continuously variable transmission system for motorcycles, provided with a device for varying the gear shift curve.

In this document the term "motorcycle" means a vehicle with two, three or four wheels, pivoting or non pivoting, such as the Vespa®, Ape® or MP3® vehicles marketed by the Applicant.

The Continuously Variable Transmission (CVT) is a type of automatic transmission for vehicles in which the transmission ratio can vary continuously between two limit values. The continuous transmission is widely used in two-wheeled vehicles with a small and medium engine size, in particular motor scooters.

In a conventional CVT, the variation of the transmission ratio takes place by varying the winding diameter of the belt on two pulleys, one of which is the drive pulley and the other driven, and at least one of these has the ability to draw together and distance the two parts or half-pulleys which it is composed of.

Typically, the drive pulley comprises a speed regulator made with centrifugal masses, generically referred to as "rollers", which have the task of realizing the axial drawing together of the respective half-pulleys, passing from the low gear condition (half-pulleys distant) to the condition of high gear (half-pulleys juxtaposed).

Consequently, in a conventional CVT, once the physical and geometrical characteristics of the system are set, the transmission ratio depends on the number of engine revolutions.

There is instead a need to provide a CVT transmission system in which the gear shift curve can be modified according to the acceleration or deceleration requirements of the driver.

In other words, there is a need to provide a CVT transmission system which, for example, in the case in which, starting from a certain condition, the driver accelerates or decelerates suddenly, adapts to and accommodates such request, facilitating the acceleration or the deceleration of the vehicle.

SUMMARY OF THE INVENTION

The object of the present invention is to provide a transmission device which satisfies the needs mentioned above.

BRIEF DESCRIPTION OF THE DRAWINGS

The characteristics and advantages of the transmission device according to the invention will be evident from the description given below, by way of a non-limiting example, according to the appended drawings, wherein.

DETAILED DESCRIPTION OF THE PREFERRED EMBODIMENT

With reference to the appended drawings, reference numeral 1 globally denotes a continuously variable transmission device, configured to be applied preferably to a two/three-wheel motorcycle, engaged with a motor shaft 2 which defines an axis of rotation X.

The transmission device 1 comprises a first drive pulley 4, driven in rotation by the motor shaft 2, and a second driven pulley (not shown), connected to each other by a V-belt 6.

The drive pulley 4 is composed of a first half-pulley 8 and a second half-pulley 10, respectively provided with facing, truncated-cone active surfaces 8a, 10a, sliding along said axis of rotation X so as to juxtapose and distance the active surfaces 8a, 10a, and integral with each other in rotation.

The first half-pulley 8 comprises in particular a mobile bushing 9, which carries the active surface 8a and provides a bushing 8b coaxial to the motor shaft 2, and a speed controller 12 comprising a container 14, supported by the mobile bushing 9 and provided with a shaped seat 16, and a plurality of rollers 18, housed in the seat 16.

The rollers realize centrifugal masses which, as the number of engine revolutions increases, push the first half-pulley 8, and in particular the mobile bushing 9, towards the second half-pulley 10.

This way, the winding diameter of the belt 6 on the drive pulley 4 increases and the belt, not being able to stretch, operates to decrease the winding diameter on the driven pulley, increasing the transmission ratio (high gear).

The drive pulley 4 further comprises a fixed bushing 11, having a main extension along the axis of rotation X, coaxial to the motor shaft 2 and coupled in rotation therewith, for example via a grooved profile.

The mobile bushing 9 is engageable in rotation by the fixed bushing 11 and is axially translatable with respect to it by the engagement of respective cam profiles.

The transmission device 1 comprises a cam system operating between the fixed bushing 11 and the mobile bushing 9 suitable to transmit the rotation between the fixed bushing 11 and the mobile bushing 9, and configured to prevent the approach between the active surfaces 8a, 10a or to facilitate the approach between them.

For example, according to a first embodiment (FIGS. 1 to 4), the drive pulley 4 comprises at least one pin 20, for example of steel (FIGS. 1 and 2), fastened to the fixed bushing 11 and projecting radially outwards therefrom.

Figure 1:
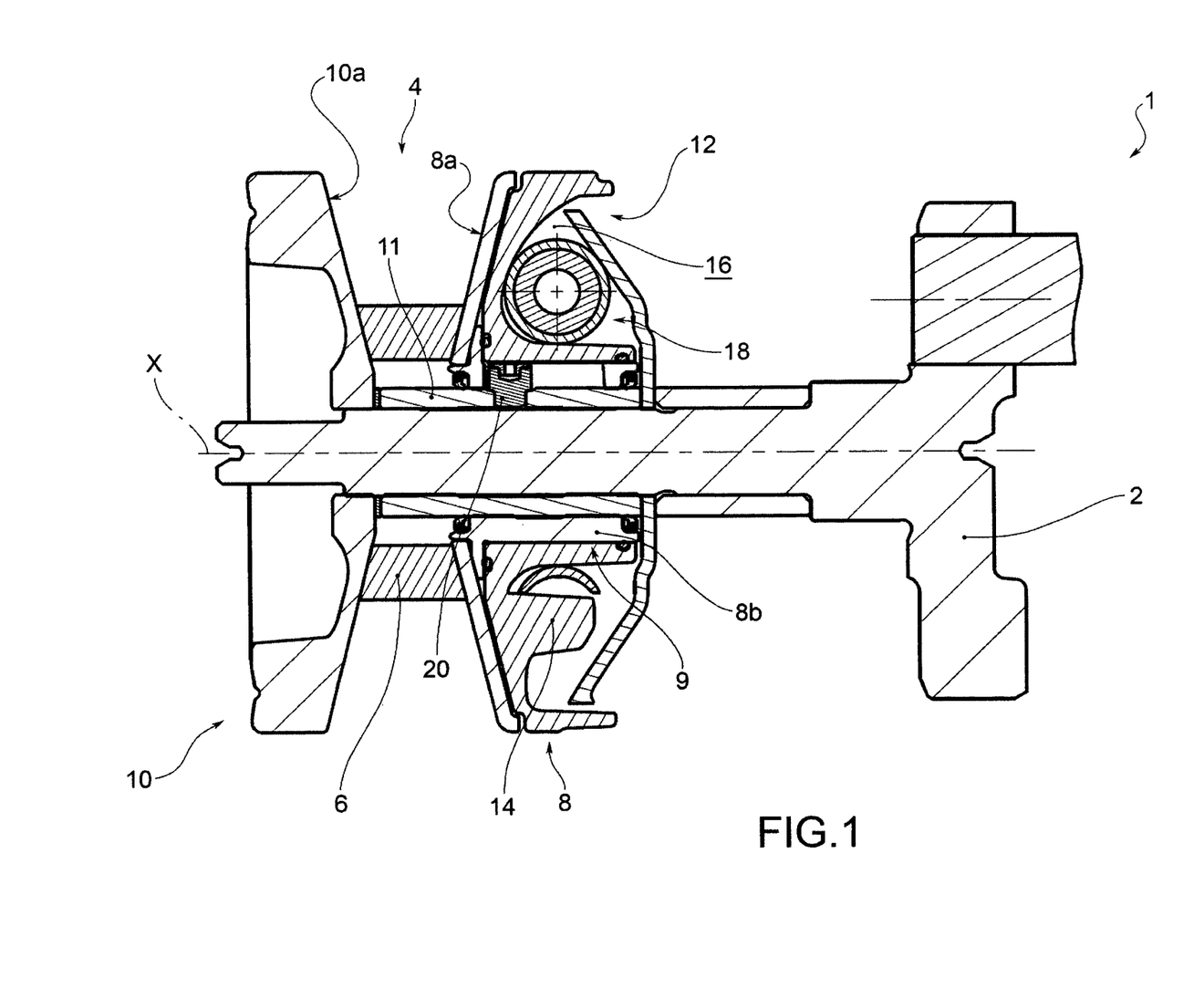
FIG. 1 shows a longitudinal cross-section of a transmission device for vehicles according to one embodiment of the present invention.
Figure 2:
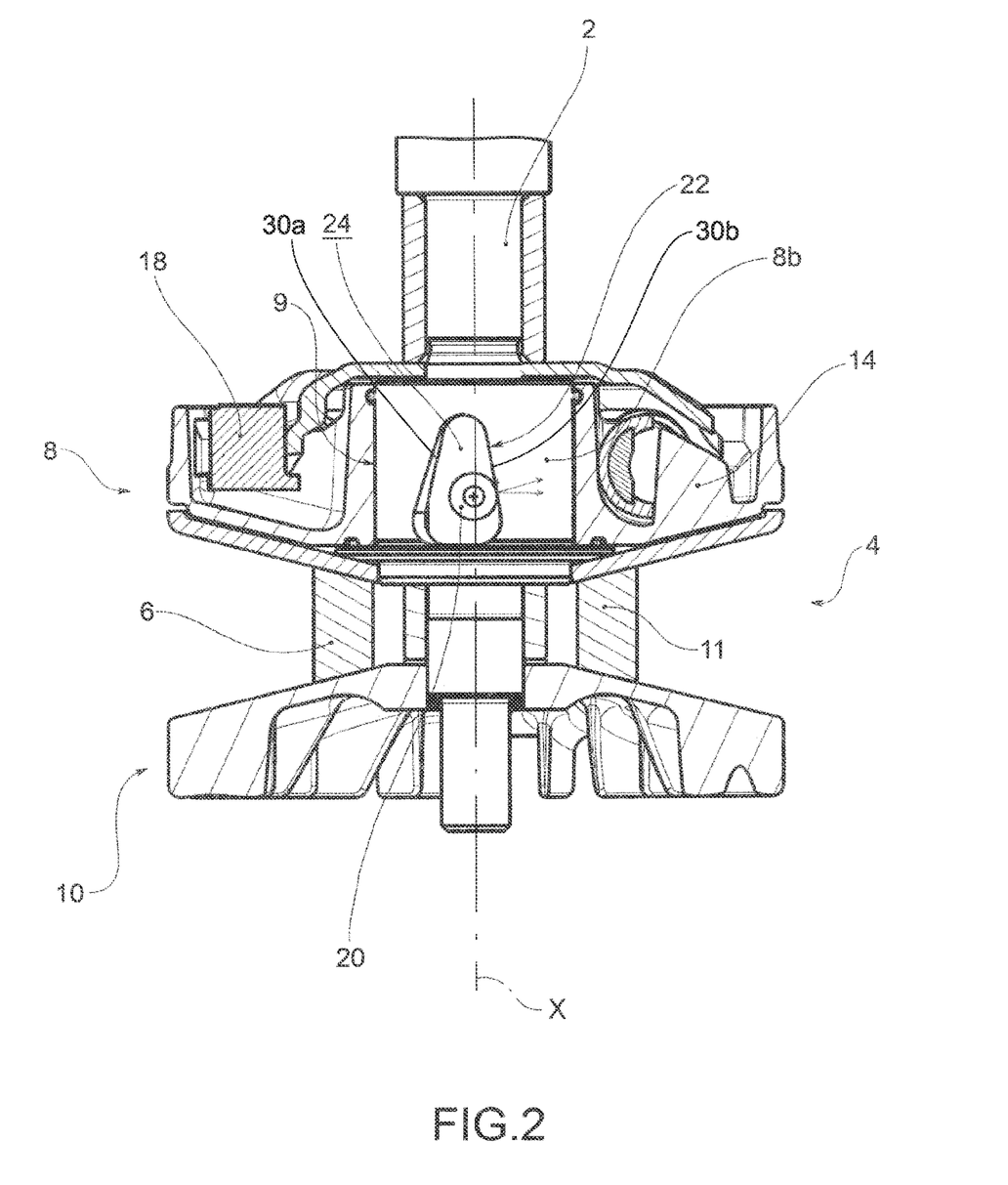
FIG. 2 represents a cross-section of the transmission device in FIG. 1, in which a cam profile of a mobile bushing is highlighted.
Figure 3:
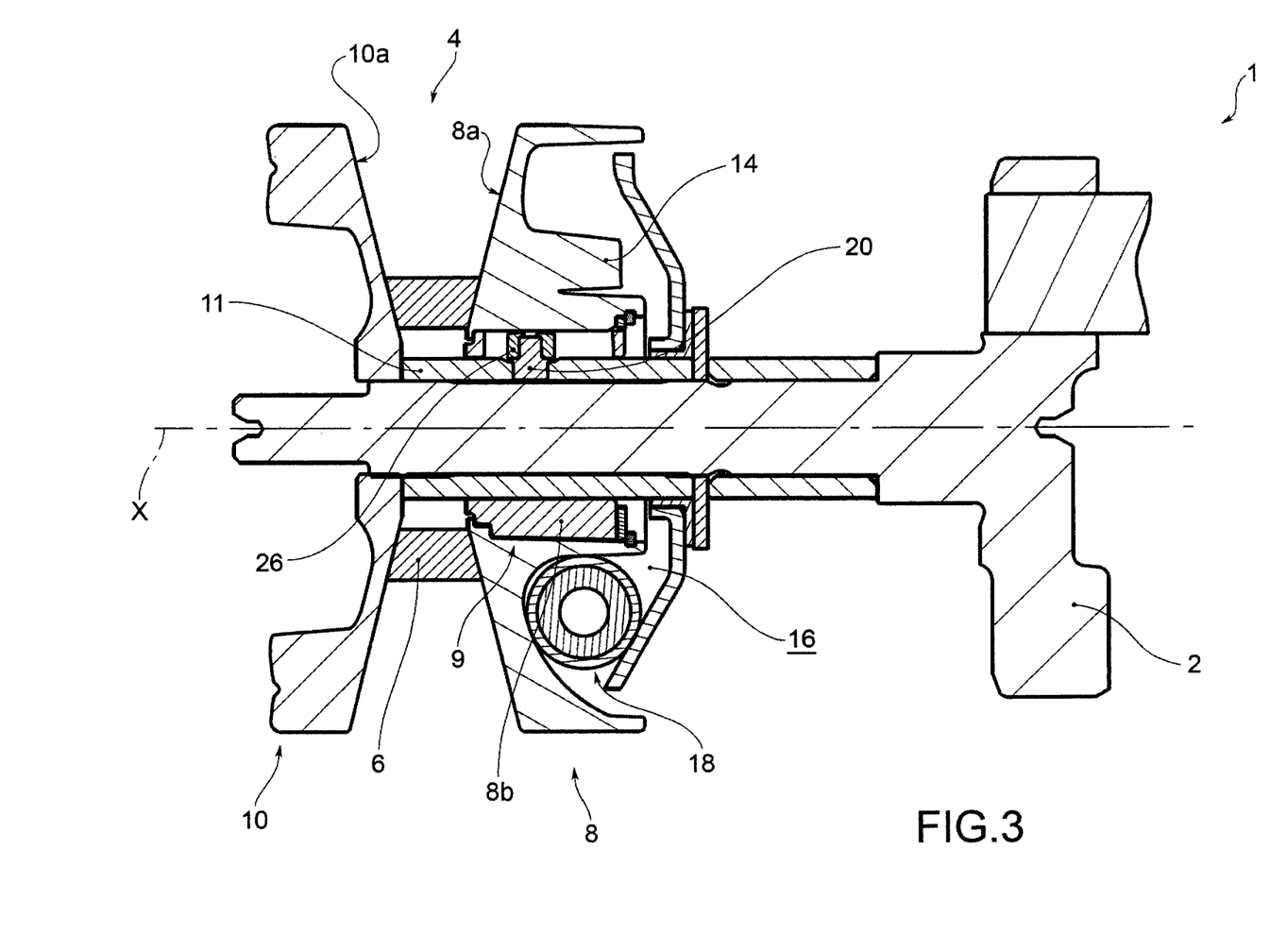
FIG. 3 shows a longitudinal cross-section of a transmission device according to the present invention, according to a further embodiment.

Correspondingly, the mobile bushing 9 has a first cam profile 22, for example composed of the closed peripheral edge of a cam opening 24 passing radially through the mobile bushing 9.

According to an embodiment variant (FIGS. 3 and 4) the pin 20 comprises a hood 26, for example in plastic material, for example self-lubricating (for example TBD), which covers the head, so as to come into contact with the cam profile 22 of the mobile bushing 9.

Figure 4:
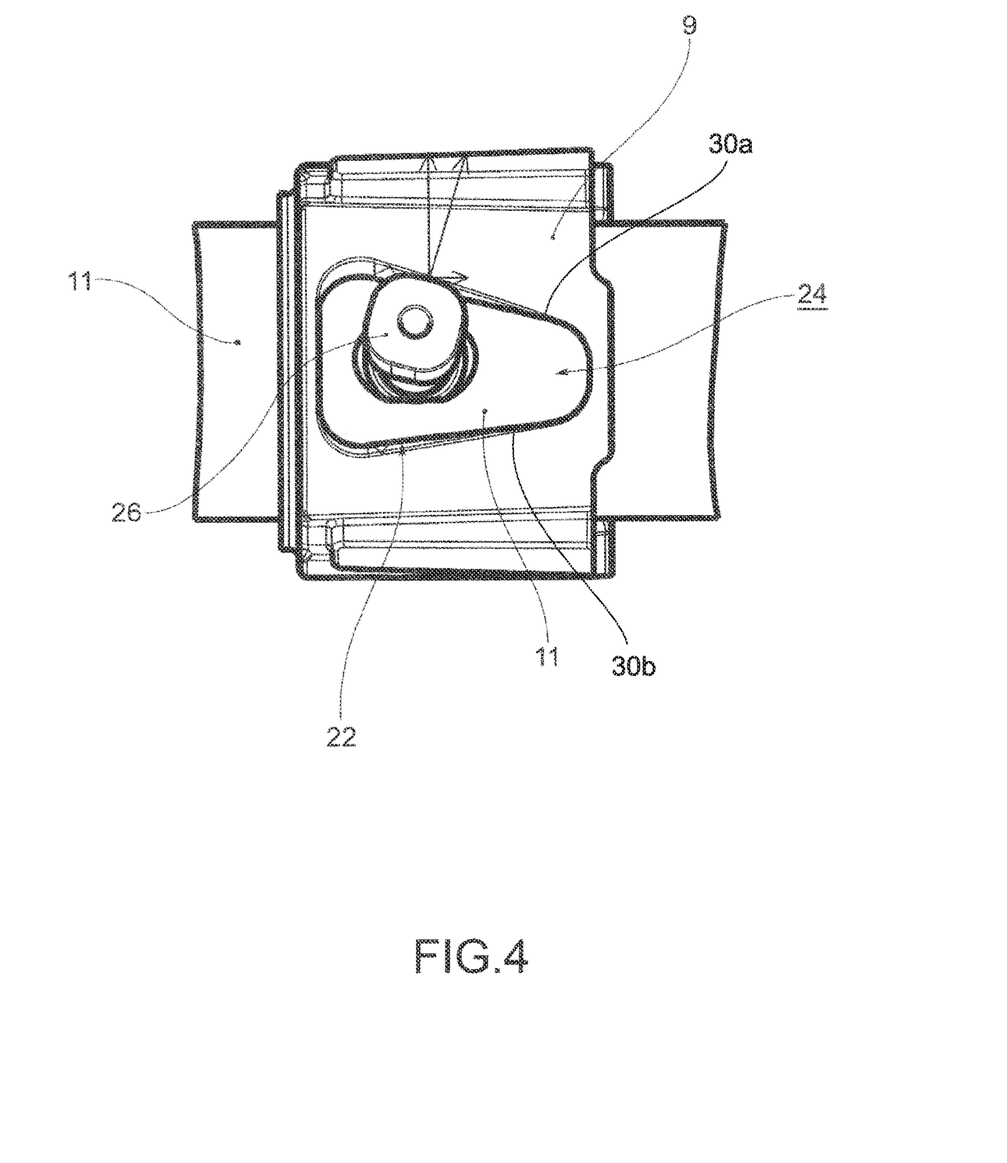
FIG. 4 schematically shows a pin with a hood in contact with a cam profile of the mobile bushing of the device in FIG. 3.
Figure 5:
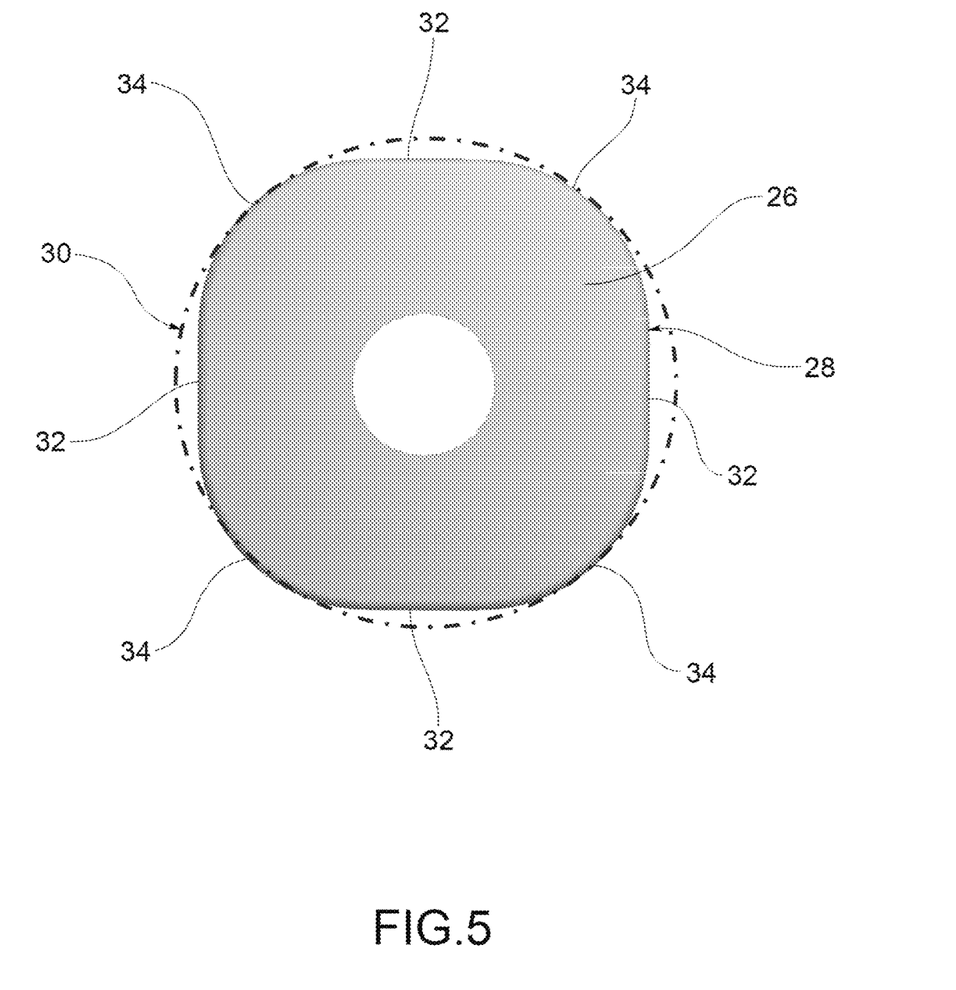
FIG. 5 shows a plan view of the hood in FIG. 4.

For example, the hood 26 is provided with an annular side surface 28 which produces a rounded profile, for example inscribed in an imaginary circular cylindrical surface 30. Preferably, said side surface 28 provides for flat portions 32 connected by arched portions 34.

Advantageously, this conformation of the hood makes it possible to minimise the loads transmitted by the fixed bushing 11 to the mobile bushing 9 and vice versa.

The cam profile 22 is closed and has an active portion 30a, against which the pin 20 abuts when the motor shaft 2 exerts an active torque (acceleration phase), and a braked portion 30b, against which the pin 20 abuts when the motor shaft 2 exerts a braked torque (deceleration phase).

Figure 6A:
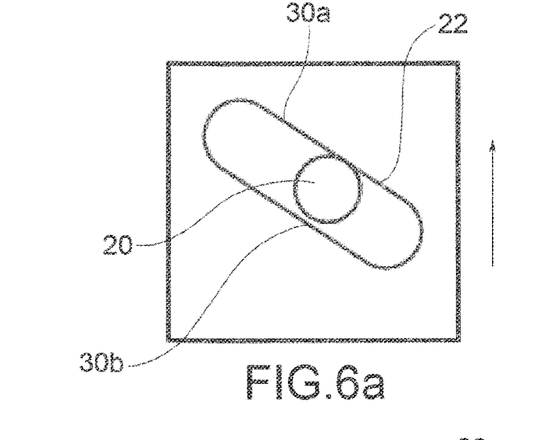
FIGS. 6a to 6d illustrate embodiment variants of cam profiles.

For example, in FIG. 6a, if the direction of rotation of the motor shaft 2 is indicated by the arrow F, during an acceleration phase, the pin 20 abuts with the active portion 30a of the profile 22; instead, during a deceleration phase, the pin 20 abuts with the braked portion 30b of the profile 22.

Figure 6B:
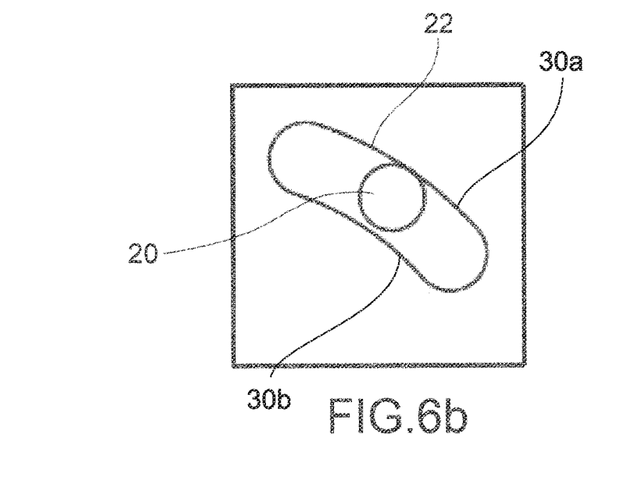

According to a first embodiment variant, the cam profile provides for a linear active portion 30a and a linear braked portion 30b, the same as the active portion 30a (FIG. 6a); according to a further embodiment variant, the cam profile 22 provides for a curved active portion 30a and a curved braked portion 30b, the same as the active portion 30a (FIG. 6b).

Figure 6C:
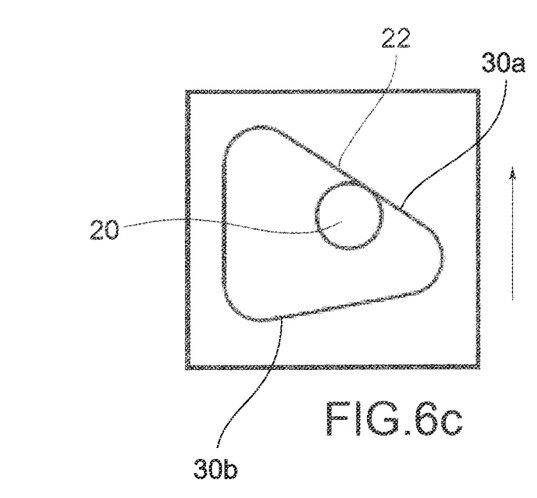
Figure 6D:
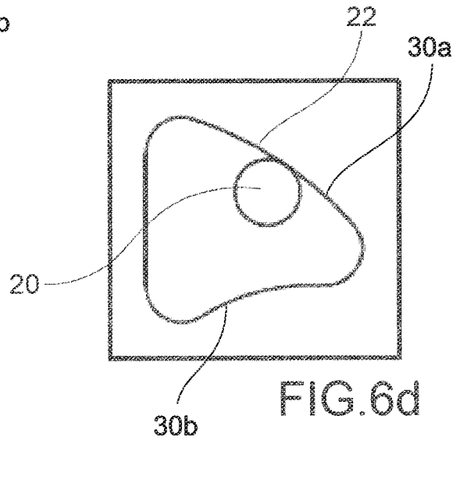

According to a further embodiment variant, the cam profile provides for a linear active portion 30a and a linear braked portion 30b, different, for example in inclination, from the active portion 30a (FIG. 6c); according to yet a further embodiment variant, the cam profile 22 provides for a curved active portion 30a and a curved braked portion 30b, different, for example in pattern, from the active portion 30a (FIG. 6d).

According to a further embodiment (FIGS. 7 and 8) the fixed bushing 11 and the mobile bushing (9) axially penetrate each other and the penetrating portions define a drive profile 32a on the fixed bushing 11 and a driven profile 32b on the mobile bushing 32b.

Figure 7:
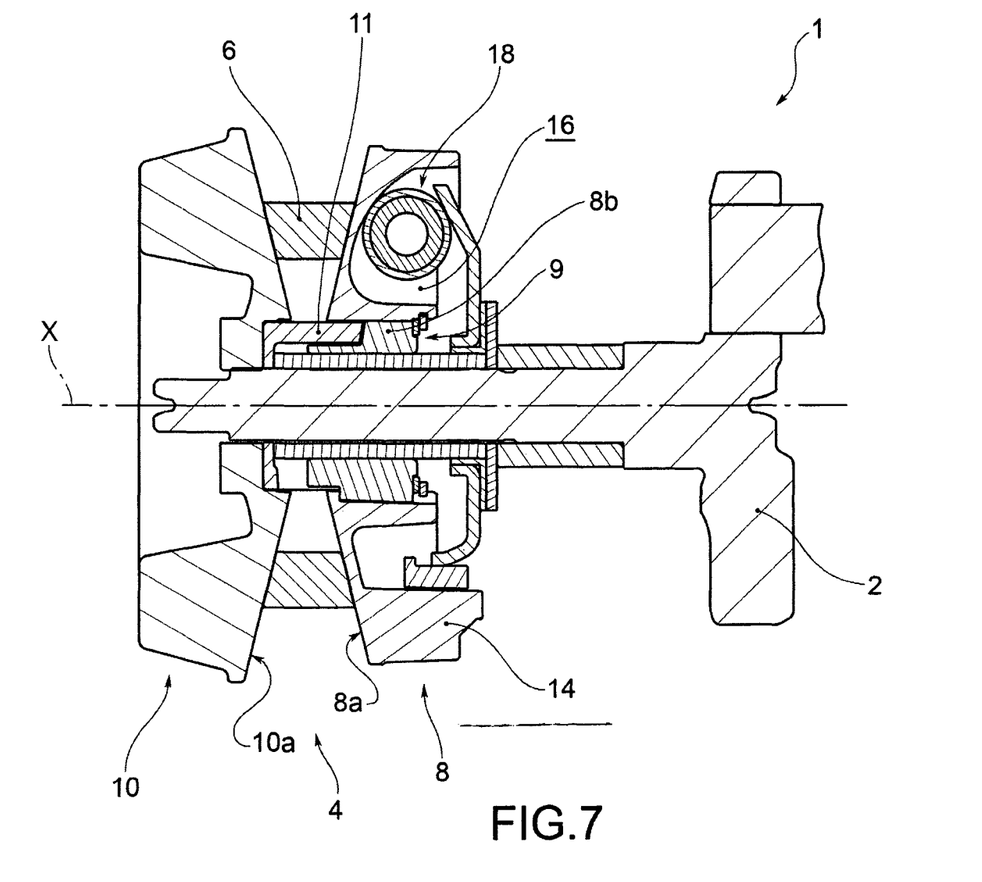
FIG. 7 shows a longitudinal cross-section of a transmission device according to the present invention, according to yet a further embodiment.
Figure 8:
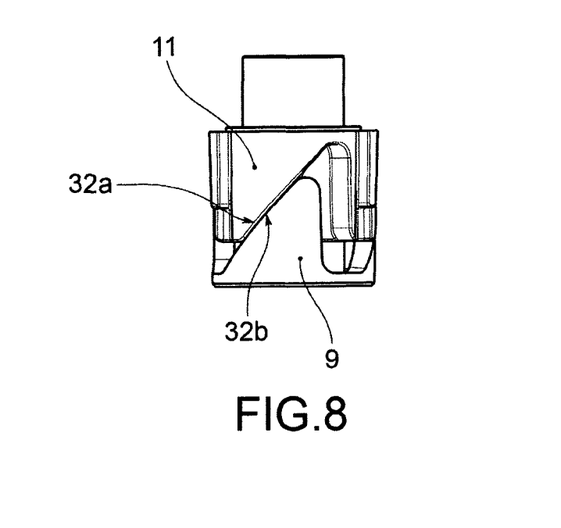
FIG. 8 schematically shows reciprocally penetrating portions of the mobile bushing and the fixed bushing of the transmission device in FIG. 7.

In this embodiment, the container 14, which carries the active surface 8a, is axially movable on the mobile bushing 9.

During normal operation of the transmission device 1, in case of active torque transmitted by the motor shaft, in the case of acceleration by the driver starting from a low gear, the cam system opposes an advancement of the active surface 8a of the first half-pulley 8 towards the active surface 10a of the second half-pulley 10, so that the gear shift is delayed and the behaviour of the transmission device is more sporting than a standard CVT.

In the case instead of braked torque transmitted by the motor shaft, for example in the case of deceleration by the driver by releasing the throttle or braking, or with the vehicle moving downhill starting from a high gear, the cam system facilitates the distancing of the active surface 8a of the first half-pulley 8 from the active surface 10a of the second half-pulley 10, so that shift down and therefore a more accentuated deceleration compared to a standard CVT is facilitated.

Innovatively, the transmission device described above makes it possible to satisfy the aforementioned need, since it makes it possible to accommodate the driver's wish to accelerate or decelerate.

Advantageously, moreover, by suitably shaping the profiles of the cam system, it is possible to design a transmission device that responds more or less abruptly to an acceleration or a deceleration.

Figure 9:
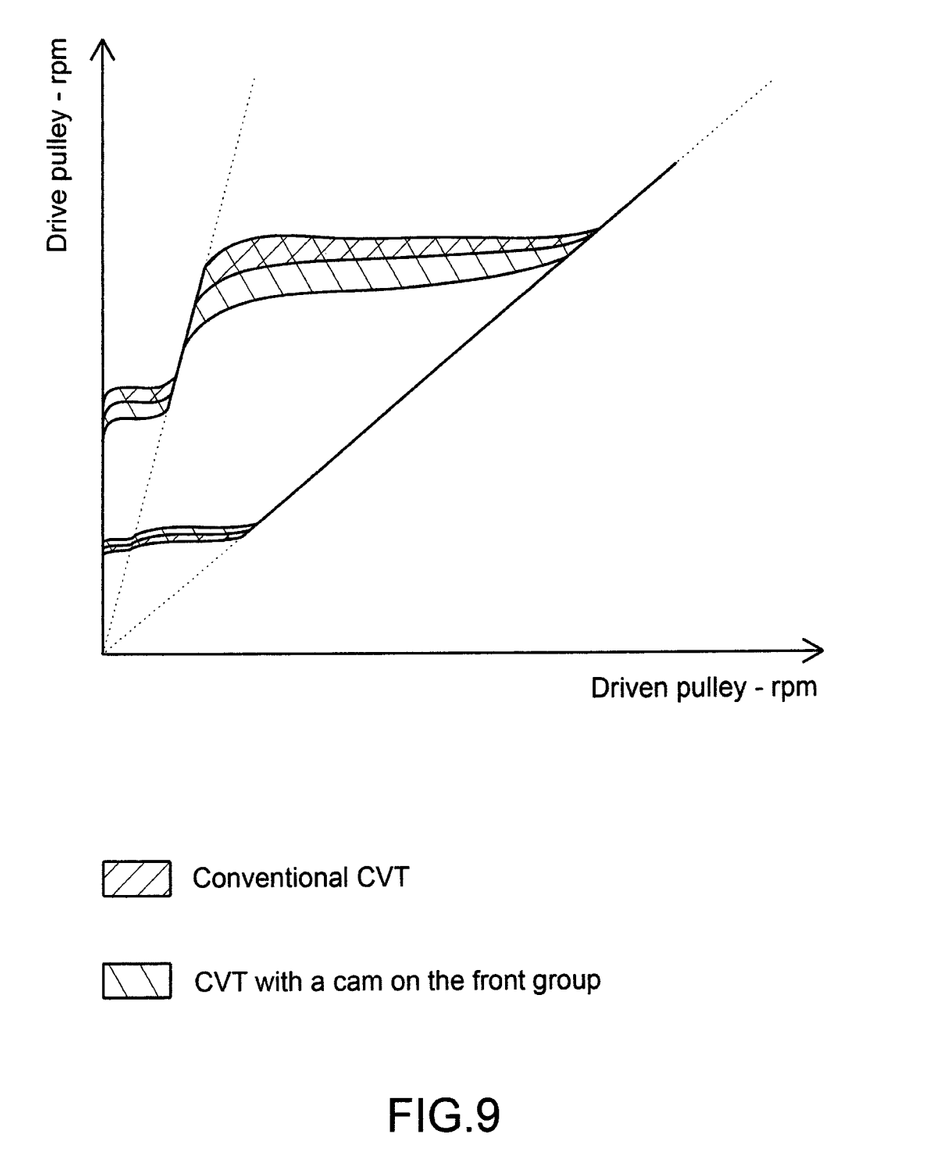
FIG. 9 shows a graph representing the revolutions of the drive pulley and the driven pulley in a conventional CVT transmission system and the CVT transmission system according to the present invention.

For example, FIG. 9 shows the engine revolutions of the drive pulley and the driven pulley, for a conventional CVT transmission system and for a CVT transmission system according to the present invention. The latter clearly shows a greater hysteresis.

According to a further advantageous aspect, using a hood applied to the suitably shaped pin, it is possible to limit the stresses concentrated between the pin and mobile bushing.

Advantageously, moreover, if said hood is made of plastic material, it is possible to eliminate the need for lubrication between the pin and the mobile bushing.

It is clear that a person skilled in the art may make modifications to the transmission device described above so as to satisfy contingent requirements, all contained within the scope of protection as defined by the appended claims.

The invention claimed is:

1. A continuously variable transmission device for a two-wheel, three-wheel or four-wheel motorcycle, connectable to a motor shaft, comprising:
   a drive pulley provided with active surfaces for a V-belt, equipped with a mobile bushing carrying one of said active surfaces, said mobile bushing being slidable axially under action of rollers of a speed regulator to obtain a gear shift between low gear and high gear;
   a fixed bushing fixable and coaxial to the motor shaft;
   a cam system operating between the fixed bushing and the mobile bushing for transmitting rotation between the fixed bushing and the mobile bushing, configured to prevent an approach between the active surfaces or to facilitate the approach between the active surfaces;
   wherein the cam system comprises at least one pin fixed to the fixed bushing and projecting radially outwards from the fixed bushing and a closed first cam profile of the mobile bushing, the closed first cam profile comprising an active portion, against which the at least one pin abuts when the motor shaft exerts an active torque in an acceleration phase, the active portion extending obliquely to a rotational axis of the motor shaft, and a braked portion distinct from the active portion, against which the at least one pin abuts when the motor shaft exerts a braked torque during a deceleration phase;
   wherein the active portion is linear and the braked portion is linear and has an inclination opposite an inclination of the active portion.

2. A transmission device according to claim 1, wherein the closed first cam profile comprises a closed peripheral edge of a cam opening passing radially through the mobile bushing.

3. A transmission device according to claim 2, wherein the at least one pin comprises a hood made of plastic material, the hood covering a head of the at least one pin, to contact with the closed first cam profile of the mobile bushing.

4. A transmission device according to claim 3, wherein the hood is provided with an annular lateral surface that defines a rounded profile.

5. A transmission device according to claim 1, wherein the closed first cam profile comprises a substantially acute triangular profile.

6. A transmission device according to claim 5, wherein the linear active portion and the linear braked portion form two sides of the closed first cam profile.

* * * * *